US006796416B2

(12) United States Patent
Ogura et al.

(10) Patent No.: US 6,796,416 B2
(45) Date of Patent: Sep. 28, 2004

(54) HIGH-SPEED ESCALATOR FOR SLOPE

(75) Inventors: Manabu Ogura, Tokyo (JP); Takashi Yumura, Tokyo (JP); Joichi Nakamura, Fukuoka (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/451,523

(22) PCT Filed: Oct. 11, 2002

(86) PCT No.: PCT/JP02/10613

§ 371 (c)(1),
(2), (4) Date: Jun. 24, 2003

(87) PCT Pub. No.: WO03/040014

PCT Pub. Date: May 15, 2003

(65) Prior Publication Data

US 2004/0060799 A1 Apr. 1, 2004

(30) Foreign Application Priority Data

Nov. 5, 2001 (JP) ........................................ 2001-339432

(51) Int. Cl.[7] ................................................ B65G 23/00
(52) U.S. Cl. ........................ 198/334; 198/321; 198/326
(58) Field of Search ................................. 198/321, 334, 198/326

(56) References Cited

U.S. PATENT DOCUMENTS 3,672,484 A * 6/1972 Angioletti et al. .......... 198/334
3,834,520 A * 9/1974 Patin .......................... 198/334
3,908,811 A * 9/1975 Cortese et al. .............. 198/334
4,066,161 A * 1/1978 Michalon et al. ........... 198/334
4,197,933 A * 4/1980 Dunstan et al. ............. 198/334
4,240,537 A * 12/1980 Dunstan ...................... 198/334
4,462,514 A * 7/1984 Dunstan ...................... 198/334
4,930,622 A * 6/1990 Sansevero .................... 198/328
4,953,685 A * 9/1990 Johnson ....................... 198/328
5,115,899 A * 5/1992 Nakatani ..................... 198/334
6,588,573 B1 * 7/2003 Ogura et al. ................ 198/334
6,675,949 B1 * 1/2004 Gonzalez Alemany et al. .. 198/334
6,685,003 B2 * 2/2004 Copeland et al. ........... 198/326

FOREIGN PATENT DOCUMENTS

JP 51-116586 10/1976
JP 2002-332182 11/2002
JP 2003-2572 1/2003

* cited by examiner

*Primary Examiner*—Richard Ridley
(74) *Attorney, Agent, or Firm*—Leydig, Voit & Mayer, Ltd.

(57) ABSTRACT

In an escalator with a high speed inclined section, shape of an auxiliary rail is set, in a section between a forward path side horizontal section and a forward path side constant inclined section of a circulation path, such that, of steps adjacent to each other, a moving track of a relative position of a step on a lower step side with respect to a step on an upper step side is the same as surface shape of a riser of the step on the upper step side.

3 Claims, 6 Drawing Sheets

HIGH-SPEED ESCALATOR FOR SLOPE

TECHNICAL FIELD

This invention relates to an escalator with a high speed inclined section in which steps move faster in an inclined section than in upper and lower horizontal sections.

BACKGROUND ART

Nowadays, a large number of escalators of great height are installed in subway stations or the like. In an escalator of this type, the passenger is obliged to stand on a step for a long period of time, which is often rather uncomfortable. In view of this, a high-speed escalator has been developed. However, in such a high-speed escalator, there is a limitation regarding the traveling speed from the viewpoint of allowing the passengers to get off and on safely.

In view of this, there has been proposed an escalator with a high speed inclined section in which the steps move faster in the intermediate inclined section than in the upper and lower horizontal sections, whereby it is possible to shorten the traveling time for the passenger.

FIG. 4 is a schematic side view showing a conventional escalator with a high speed inclined section described, for example, in JP 51-116586 A. In the figure, a plurality of steps 2 coupled in an endless manner are provided in a main frame 1. The steps 2 are driven by a drive unit (step driving means) 3 and moved to circulate.

A forward path side section of a circulation path of the steps 2 has a forward path upper side horizontal section A to be an upper side platform portion, a forward path side upper curved section B, a forward path side constant inclination section C, a forward path side lower curved section D, and a forward path lower side horizontal section E to be a lower side platform portion.

Next, FIG. 5 is a side view showing the vicinity of the forward path side upper curved section B of FIG. 4 in an enlarged state. In the figure, a step 2 has a tread 4 for carrying a passenger; a riser 5 hinged at a front or rear end of the tread 4; a driving roller shaft 6; a pair of rotatable driving rollers 7 attached to the driving roller shaft 6; a trailing roller shaft 8; and a pair of rotatable trailing rollers 9 attached to the trailing roller shaft 8.

Each driving roller 7 is guided by a driving rail 19 supported by a main frame 1. Each trailing roller 9 is guided by a trailing rail 11 supported by the main frame 1. Note that shapes of the forward path side driving rail 10 and the forward path side trailing rail 11 are formed such that the tread 4 of the step 2 always remains level in forward path side sections.

The driving roller shafts 6 of the adjacent steps 2 are coupled with each other by a link mechanism 13. The link mechanism 13 has first to fifth links 14 to 18.

One end portion of the first link 14 is pivotably coupled to the driving roller shaft 6. The other end portion of the first link 14 is pivotably coupled to a middle portion of the third link 16 via a shaft 20. One end portion of the second link 15 is pivotably coupled to the driving roller shaft 6 of the step 2 adjacent to it. The other end portion of the second link 15 is pivotably coupled to a middle portion of the third link 16 via the shaft 20.

One end portion of the fourth link 17 is pivotably coupled to a middle portion of the first link 14. One end portion of the fifth link 18 is pivotably coupled to a middle portion of the second link 15. The other end portions of the fourth and fifth links 17 and 19 are coupled to one end portion of the third link 16 via a sliding shaft 21.

A guiding groove 16 a for guiding sliding of the sliding shaft 21 in a longitudinal direction of the third link 16 is provided at one end portion of the third link 16. A rotatable auxiliary roller 19 is provided at the other end portion of the third link 16. The auxiliary roller 19 is guided by an auxiliary rail 22 supported by the main frame 1.

The auxiliary roller 19 is guided by the auxiliary rail 22, whereby the link mechanism 13 is transformed and a gap between the adjacent steps 2, that is, an interval between the driving roller shafts 6 of the adjacent steps 2 is changed. In other words, a track of the auxiliary rail 22 is designed so that the gap between the adjacent steps 2 changes.

Next, operation thereof will be described. A The speed of the step 2 is changed by changing the interval between the driving roller shafts 6 of the adjacent steps 2. That is, in a forward path upper side horizontal section A and a forward path lower side horizontal section E where a passenger gets on and off the escalator, the interval between the driving roller shafts 6 becomes the smallest, and the step 2 moves at low speed. In addition, in a forward path side constant inclined section C, the interval between the driving roller shafts 6 becomes the largest, and the step 2 moves at high speed. Moreover, in a forward path side upper curved section B and a forward path side lower curved section D, the interval between the driving roller shafts 6 is changed, and the step 2 accelerates or decelerates to travel.

The first, second, fourth, and fifth links 14, 15, 17, and 18 constitute a so-called pantograph type quadric link mechanism, and an angle defined by the first and second links 14 and 15 can be increased and reduced with the third link 16 as a symmetrical axis. Accordingly, an interval between the driving roller shafts 6 coupled to the first and second links 14 and 15 can be changed.

In the upper and lower horizontal sections A and E of FIG. 4, the interval between the driving roller shafts 6 of the adjacent steps 2 is the smallest. When an interval between the driving rail 10 and the auxiliary rail 22 is reduced from this state, the link mechanism 13 moves in the same manner as a movement of a frame of an umbrella at the time when it is opened, and the interval between the driving roller shafts 6 of the adjacent steps 2 increases.

In the constant inclined section C of FIG. 4, the interval between the driving rail 10 and the auxiliary rail 22 is the smallest, and the interval between the driving roller shafts 6 of the adjacent steps 2 is the largest. Therefore, a speed of the step 2 in this area reaches the maximum. In addition, in this state, the first and second links 14 and 15 are arranged substantially in a straight line.

However, in the conventional escalator with a high speed inclined section constituted as described above, the auxiliary rail 22 in each of the forward path side upper curved section B and the forward path side lower curved section D is formed substantially in a mere arc shape which smoothly joins the horizontal sections A and E and the constant inclined section C. Therefore, in the forward path side upper curved section B and the forward path side lower curved section D, a track of relative movement of a step 2 adjacent to a certain step 2 (track of a relative change of positions of the driving roller shafts 6 of the adjacent steps 2 ) is not in conformity with a shape of the riser 5.

In addition, in FIG. 5, a length of the tread 4 is determined such that a gap is not generated between the riser 5 and a leading edge of the tread 4 of the step 2 adjacent to it in the horizontal sections A and E and the constant inclined section C. In the case in which the length of the tread 4 is determined as described above and the auxiliary rail 22 in each of the forward path side upper curved section B and the forward path side lower curved section D is formed substantially in a mere arc shape, interference occurs between the riser 5 and the leading edge of the tread 4, and smooth movement of the step 2 becomes difficult to be realized in the forward path side upper curved section B and the forward path side lower curved section D.

Conversely, in the case in which the length of the tread 4 is determined such that the leading edge of the tread 4 does not interfere with the riser 5 in the forward path side upper curved section B and the forward path side lower curved section D, and the auxiliary rail 22 in each of the forward path side upper curved section B and the forward path side lower curved section D is formed substantially in a mere arc shape, as shown in FIG. 6, a gap 23 is generated between the riser 5 and the leading edge of the tread 4 in the horizontal sections A and E and the constant inclined section C.

DISCLOSURE OF THE INVENTION

The present invention has been made in order to solve the problem described above, and it is therefore an object of the present invention to obtain an escalator with a high speed inclined section which can prevent a leading edge of a tread from interfering with a riser of a step adjacent to it or a gap from being generated between a riser of a step and the tread which are adjacent to each other.

To this end, according to one aspect of the present invention, there is provided an escalator with a high speed inclined section comprising: a main frame; a plurality of steps each having a tread for carrying a passenger; a riser provided at a front or rear end of the tread; a driving roller shaft; and a driving roller rotatable about the driving roller shaft, the plurality of steps being coupled in an endless manner to be moved so as to circulate along a circulation path; a plurality of link mechanisms which couple the driving roller shafts of the steps adjacent to each other for changing an interval between the driving roller shafts by being transformed; a rotatable auxiliary roller provided to each of the link mechanisms; a driving rail provided to the main frame for guiding a movement of the driving roller; and an auxiliary rail provided to the main frame for guiding a movement of the auxiliary roller and transforms the link mechanisms, wherein a shape of the auxiliary rail is set in a section between a forward path side horizontal section and a forward path side constant inclined section of the circulation path such that, of the steps adjacent to each other, a moving track of a relative position of the step on a lower step side with respect to the step on an upper step side is the same as a surface shape of the riser of the step on the upper step side.

BEST MODE FOR CARRYING OUT THE INVENTION

A preferred embodiment of the present invention will be hereinafter described with reference to the drawings.

Figure 1:
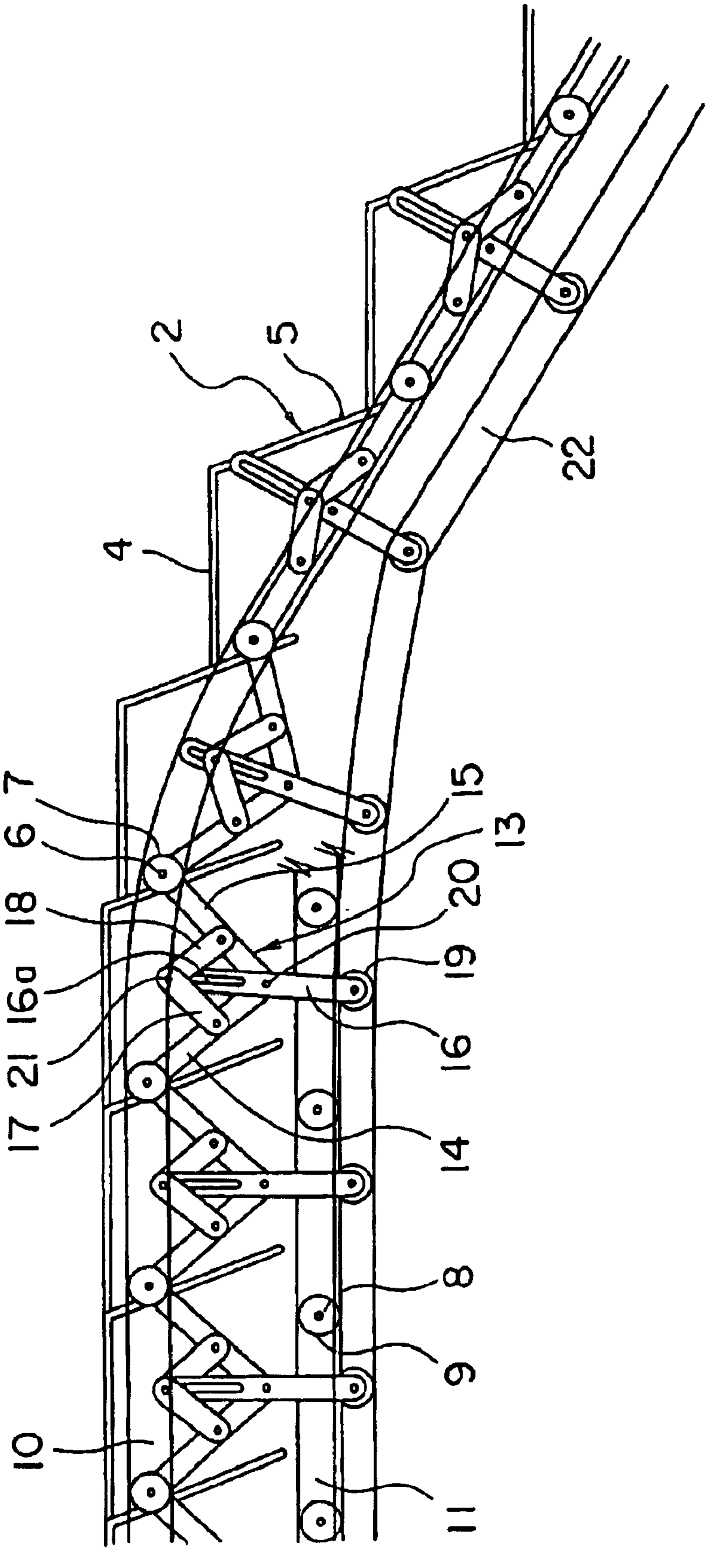
FIG. 1 is a side view showing the vicinity of a forward path side upper curved section of an escalator with a high speed inclined section according to an embodiment of the present invention in an enlarged state.
Figure 2:
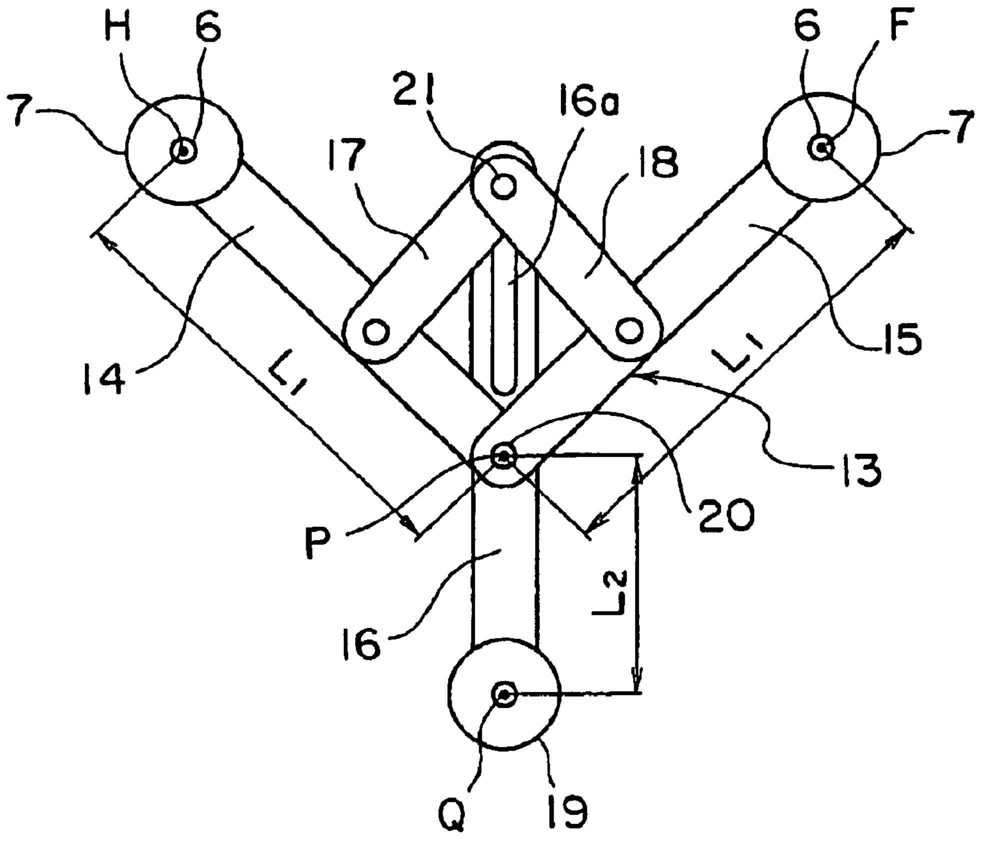
FIG. 2 is a front view showing the link mechanism of the escalator with the high speed inclined section in FIG. 1.

FIG. 1 is a side view showing the vicinity of a forward path side upper curved section of an escalator with a high speed inclined section according to an embodiment of the present invention in an enlarged state, and FIG. 2 is a front view showing the link mechanism of the escalator with the high speed inclined section of FIG. 1.

In the figures, a step 2 has a tread 4 for carrying a passenger; a riser 5 formed to be bent at the front or rear end of the tread 4; a driving roller shaft 6; a pair of rotatable driving rollers 7 attached to the driving roller shaft 6, a trailing roller shaft 8; and a pair of rotatable trailing rollers 9 attached to the trailing roller shaft 8.

Figure 4:
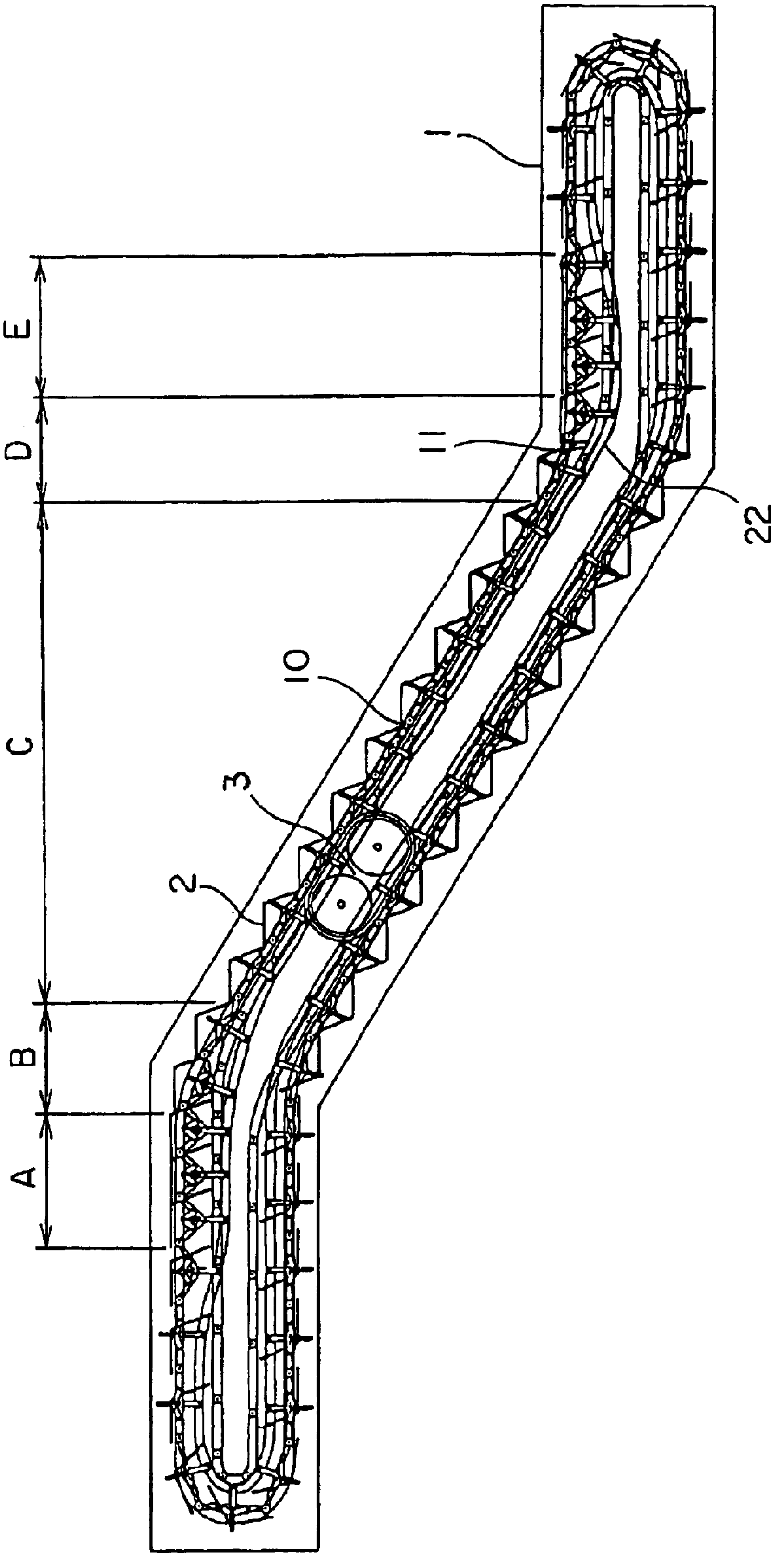
FIG. 4 is a schematic side view showing an example of a conventional escalator with a high speed inclined section.
Figure 5:
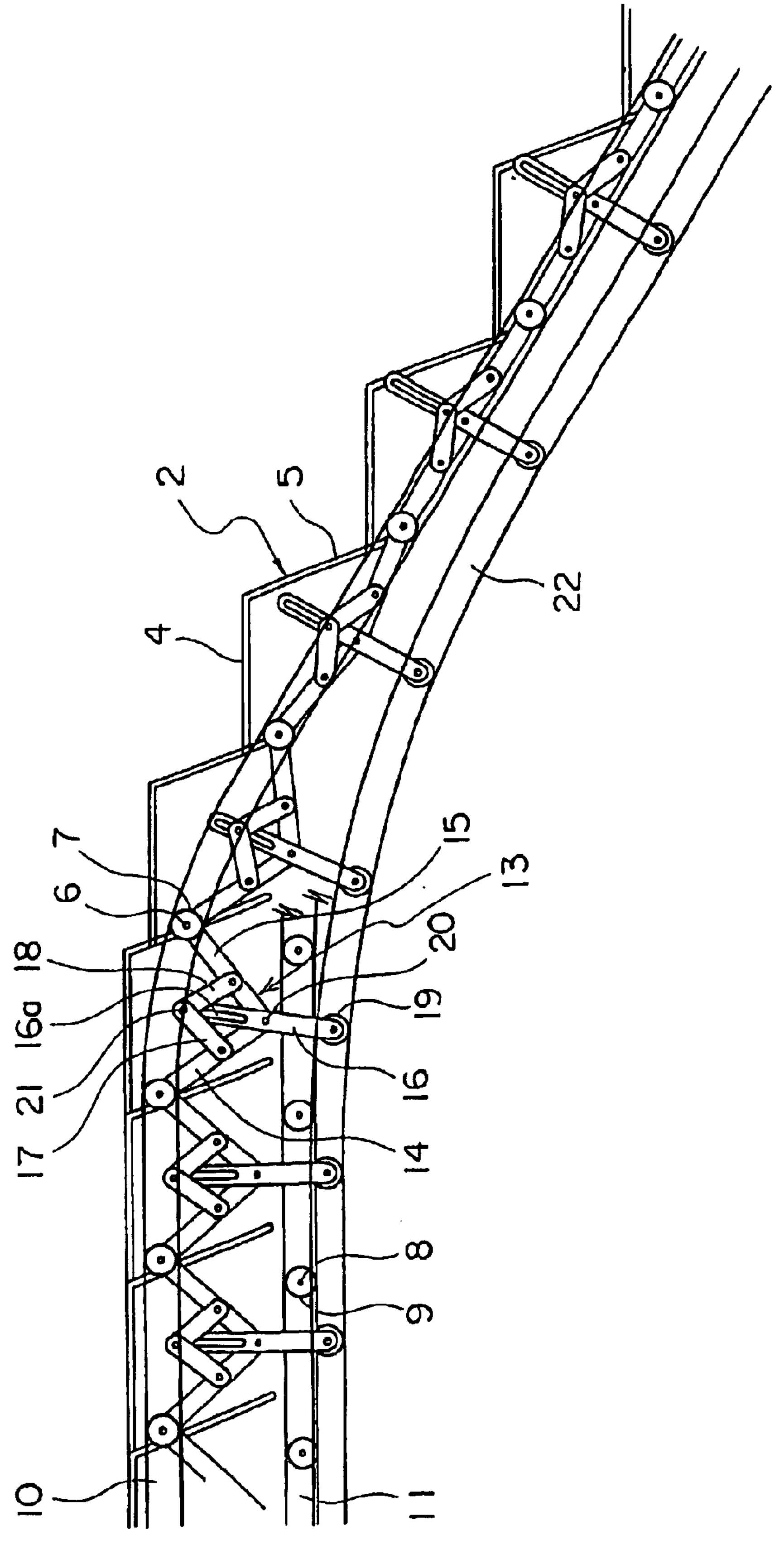
FIG. 5 is a side view showing the vicinity of the forward path side upper curved section of FIG. 4 in an enlarged state.
Figure 6:
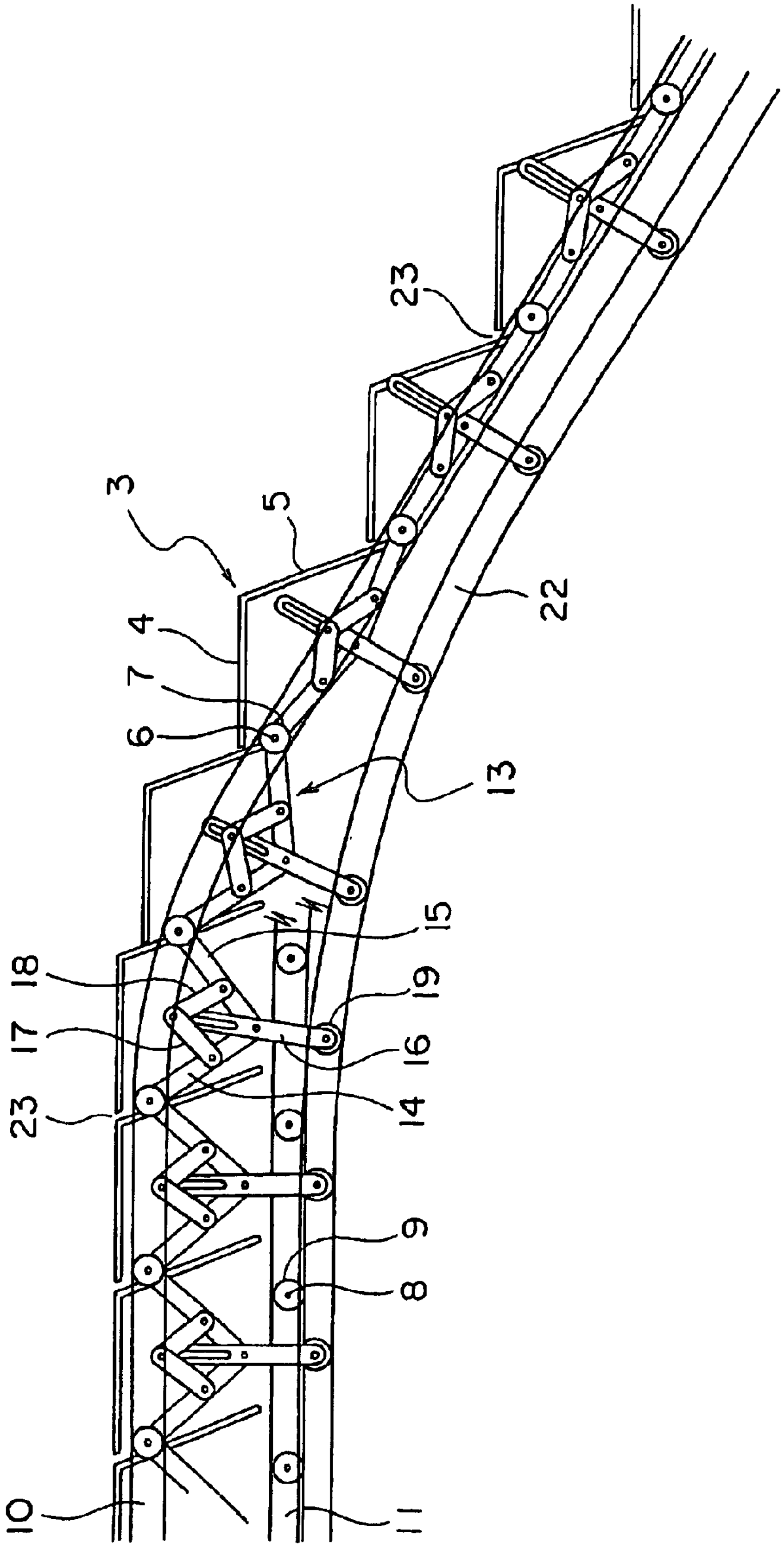
FIG. 6 is a side view showing another example of the vicinity of the forward path side upper curved section of FIG. 4.

The driving roller 7 is guided by a driving rail 10 supported by a main frame 1 (see FIG. 4). The trailing roller 9 is guided by a trailing rail 11 supported by the mainframe 1. Note that shapes of the forward path side driving rail 10 and the forward path side trailing rail 11 are formed such that the tread 4 of the step 2 always keeps a level in forward path side sections.

The driving roller shafts 6 of the adjacent steps 2 are coupled with each other by a link mechanism 13. The link mechanism 13 has first to fifth links 14 to 18.

One end portion of the first link 14 is pivotably coupled to the driving roller shaft 6. The other end portion of the first link 14 is pivotably coupled to a middle portion of the third link 16 via a shaft 20. One end portion of the second link 15 is pivotably coupled to the driving roller shaft 6 of the step 2 adjacent to it. The other end portion of the second link 15 is pivotably coupled to a middle portion of the third link 16 via the shaft 20.

One end portion of the fourth link 17 is pivotably coupled to a middle portion of the first link 14. One end portion of the fifth link 18 is pivotably coupled to a middle portion of the second link 15. The other end portions of the fourth and fifth links 17 and 18 are coupled to one end portion of the third link 16 via a sliding shaft 21.

A guiding groove **16*a* for guiding slide of the sliding shaft 21 in a longitudinal direction of the third link 16 is provided at one end portion of the third link 16. A rotatable auxiliary roller 19 is provided at the other end portion of the third link 16. The auxiliary roller 19 is guided by an auxiliary rail 22 supported by the main frame 1**.

The auxiliary roller 19 is guided by the auxiliary rail 22, whereby the link mechanism 13 is transformed and a gap between the adjacent steps 2, that is, an interval between the driving roller shafts 6 of the adjacent steps 2 is changed. In other words, a track of the auxiliary rail 22 is designed such that a gap between the adjacent steps 2 changes.

Figure 3:
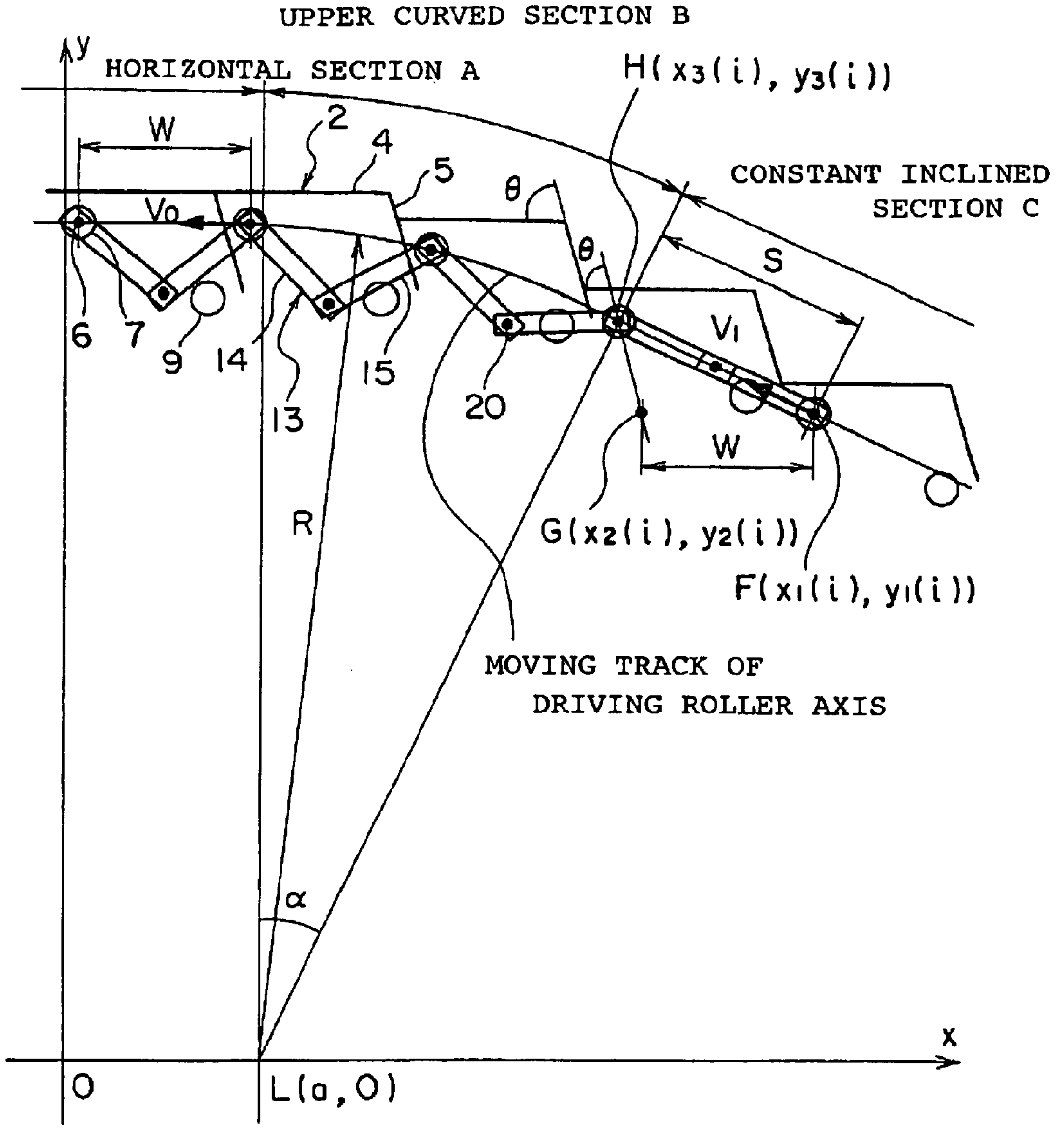
FIG. 3 is an explanatory view for explaining a method of determining the shape of the auxiliary rail in FIG. 1.

Next, a method of determining a shape of the auxiliary rail 22 according to this embodiment will be described. FIG. 3 is an explanatory view for explaining a determination method of a shape of the auxiliary rail 22 of FIG. 1. In addition, FIG. 3 is a view of the step 2 and the link mechanism 13 in the vicinity of a forward path side upper curved section B viewed from sides thereof, and shows the case in which a shape of the riser 5 is planar (linear) as an example. In addition, for the sake of simplicity, only the first and second links 14 and 15 are shown in the link mechanism 13.

When a ratio of moving speeds of the step 2 between a horizontal section A and a constant inclined section C is assumed to be k, and an inclination angle of the constant inclined section C with respect to the horizontal section A is assumed to be α, an inclination angle θ of the linear riser 5 is represented by the following expression:

$$\theta=\tan^{-1}\{(k\sin\alpha)/k\cos\alpha-1\} \quad (1)$$

In order to prevent a leading edge of the tread 4 from interfering with the riser 5 or a gap from being generated between the leading edge of the tread 4 and the riser 5 during speed change in the upper curved section B, it is sufficient to set a moving track of relative positions of the adjacent steps 2 as a straight line having the same inclination as the riser 5. That is, if the leading edges of the treads 4 of the adjacent steps 2 move along a surface of the inclined riser 5, neither the interference nor the gap is generated.

A specific method of determining a shape of the auxiliary rail 22 will be hereinafter described.

Of the two steps 2 adjacent to each other, a position of an axis H of the driving roller 7 in the step 2 on an upper step side is represented by coordinates ($X_3$ (i), $y_3$ (i)), and a position of an axis F of the driving roller 7 in the step 2 on a lower step side is represented by coordinates ($x_1$ (i), $y_1$ (i)).

Assuming that a state in which the axis H is on a boundary between the constant inclined section C and the upper curved section B is an initial state, an initial position ($x_3$ (1), $y_3$ (1)) of the axis H is represented by the following expressions. Note that an x coordinate at a border point between the horizontal section A and the upper curved section B is assumed to be a, and a radius of curvature of a moving track of the axis H in the upper curved section B is assumed to be R.

$$x_3\,(\mathbf{1})=a+R\sin\alpha \quad (2)$$

$$y_3\,(\mathbf{1})=R\cos\alpha \quad (3)$$

In addition, when a distance between the driving roller shafts 6 in the horizontal section A is assumed to be w, a distance s between the driving roller shafts 6 in the constant inclined section C is found as s=kw. Further, an initial position ($x_1$, (1), $y_1$ (1)) of the axis F of the driving roller shaft 6 in the step 2 on the lower step side is represented by the following expressions:

$$x_1(\mathbf{1})=x_3(\mathbf{1})+s\cdot\cos\alpha \quad (4)$$

$$y_1(\mathbf{1})=y_3(\mathbf{1})-s\cdot\sin\alpha \quad (5)$$

Next, movements of the step 2 at the time of an ascending operation will be described. When a speed in a step advancing direction in the horizontal section A is assumed to be $v_0$, a speed $v_1$, in the step advancing direction in the constant inclined section C is represented by the following expression:

$$v_1=kv_0 \quad (6)$$

In addition, a time $t_{ac}$ necessary for the step 2 to move the distance s between the driving roller shafts 6 in the constant inclined section C is represented by the following expression:

$$t_{ac}=s/v_1 \quad (7)$$

Moreover, when it is assumed that movements of the axes F and H of the driving rollers 6 are calculated for each time interval found by dividing $t_{ac}$ into m equal sections, a time interval dt is represented by the following expression:

$$dt=t_{ac}/m \quad (8)$$

Positions of the axes F and H at a time t=dt(i−1) will be hereinafter found by sorting them according to i. (In the above expression, i=2, 3, 4, 5, . . . n) In the case of 2≦i≦m+1

A position ($x_1$ (i), $y_1$ (i)) of the axis F is represented by the following expressions:

$$x_1(i)=x_1(\mathbf{1})-v_1\cdot t\cdot\cos\alpha \quad (9)$$

$$y_i(i)=y_1(\mathbf{1})+v_1\cdot t\cdot\sin\alpha \quad (10)$$

In addition, a position ($x_2$ (i), $y_2$ (i)) of a point G to which the axis F is horizontally moved by w on the upper step side is represented by the following expressions:

$$x_2(i)=x_1(i)-W \quad (11)$$

$$y_2\,(i)=y_1(i) \quad (12)$$

Here, since a position ($x_3$ (i), $y_3$ (i)) of the axis H is a point of intersection of a straight line with an inclination -tan θ passing the point G and a circle of a radius R with a point L as a center, the position is represented by the following expressions:

$$x_3(i)=\left[a-p_1(i)q_1(i)-\sqrt{(a-p_1(i)q_1(i))^2-(1+p_1(i)^2)(a^2+q_1(i)^2-R^2)}\,\right]\Big/(1+p_1(i)^2) \quad (13)$$

$$y_3(i)=p_1(i)x_3\,(i)+q_1(i) \quad (14)$$

Here, $p_i$(i)=-tan θ, $$q_1(i)=x_2(i)\tan\theta+y_2(i)$$

In the case of i>m+1

Since the position ($x_1$ (i), $y_1$ (i)) of the axis F tracks a track on which the axis H has passed, the position is represented by the following expressions:

$$x_1\,(i)=x_3\,(i-m) \quad (15)$$

$$y_1\,(i)=y_3\,(i-m) \quad (16)$$

The position ($x_2$ (i), $y_2$ (i)) of the point G and the position ($x_3$ (i), $y_3$ (i)) of the axis H are represented by the following expressions, respectively, in the same manner as in the expressions (11), (12), (13), and (14).

$$x_2(i)=x_1(i)-w \quad (17)$$

$$y_2(i)=y_1(i) \quad (18)$$

$$x_3(i)=\left[a-p_1(i)-q_1(i)-\sqrt{(a-p_1(i)q_1(i))^2-(1+p_1(i)^2)(a^2+q_1(i)^2-R^2)}\,\right]\Big/(1+p_1(i)^2) \quad (19)$$

$$y_3(i)=p_1(i)x_3(i)+q_1(i) \quad (20)$$

Here, $p_1$(i)=−tan θ, $$q_1(i)=x_2(i)\tan\theta+y_2(i)$$

However, at the time of $x_3(i)<a$, since the position of the axis H is a point of intersection of the straight line with an inclination $-\tan\theta$ passing the point G and a straight line y=R, the position is represented by the following expressions:

$$x_3(i)=(R-q_1(i))/p_1(i) \quad (21)$$

$$y_3(i)=R \quad (22)$$

According to the method described above, the positions of the driving roller axes F and H at the time when the interval between the driving roller shafts 6 of the adjacent steps 2 changes in the upper curved section B (at the time when the speed of the step 2 changes) can be found. Then, if these positions are found, an axial position of the auxiliary roller 19 can also be found. This will be described using FIG. 2.

FIG. 2 is an enlarged view of the link mechanism 13. When it is assumed that axial positions of the driving rollers 7 of the adjacent steps 2 are F and H and both lengths of the first and second links 14 and 15 are $L_1$, a position of an axis (inflection point) P of the shaft 20 coupling the first link 14 and the second link 15 can be found as an point of intersection of a circle of a radius $L_1$with the axis F as a center and a circle of a radius $L_1$with the axis H as a center.

In addition, a position of an axis Q of the auxiliary roller 19 can be found as a position to which a bisector of an angle defined by the first link 14 and the second link 15 is extended downward from the inflection point P by $L_2$. If a moving track of the axis Q of the auxiliary roller 19 is found, a shape of the auxiliary rail 22 can be determined by drawing parallel lines which are apart from the track by a distance equivalent to a radius of the auxiliary roller 19.

The auxiliary rail 22 of FIG. 1 is arranged in accordance with the shape determined by the above-mentioned method. As is evident from FIG. 1, the auxiliary rail 22 is not smoothly curved from the upper curved section B to the constant inclined section C and its curved shape changes discontinuously.

In this way, in this embodiment, since the shape of the auxiliary rail 22 is set such that the moving track of the relative positions of the adjacent steps 2 substantially coincides with the surface shape of the riser 5, an escalator with a high speed inclined section can be obtained in which, even at the time when the relative positions of the adjacent steps 2 change, the leading edge of the tread 4 of the step 2 adjacent to the riser 5 never interferes with the riser 5 or the gap 23 is never generated between the leading edge of the tread 4 and the riser 5.

Note that, although the upper curved section is described in the above-mentioned embodiment, the shape of the auxiliary rail 22 can be determined in the same manner for the lower curved section.

In addition, although the step 2 having the riser 5 of a planar shape is described in the above-mentioned embodiment, the shape of the auxiliary rail 22 can be determined in the same manner even if the shape of the riser 5 is a curved surface shape.

Moreover, although the shape of the auxiliary rail 22 is determined directly from the moving track of the axis Q of the auxiliary roller 19, which is found from the shape of the riser 5, in the above-mentioned embodiment, the shape of the auxiliary rail 22 may be determined after approximating the moving track of the axis Q with an arc by a straight line, other polynomials, or the like.

Furthermore, it is needless to mention that, in a section where moving loci of the axis Q join in a discontinuous manner from the upper curved section or the lower curved section to the constant inclined section, the shape of the auxiliary rail 22 may be determined after interpolating the moving loci by a curved line of a small R.

What is claimed is:

1. An escalator with a high speed inclined section comprising:

a main frame;

a plurality of steps, each step having
- a tread for carrying a passenger;
- a riser at a front or rear end of the tread;
- a driving roller shaft; and
- a driving roller rotatable about the driving roller shaft, the plurality of steps being coupled in an endless manner to circulate along a circulation path;

a plurality of transformable link mechanisms which couple the driving roller shafts of the steps adjacent to each other, changing an interval between the driving roller shafts by being transformed;

a rotatable auxiliary roller on each of the link mechanisms;

a driving rail on the main frame for guiding movement of the driving roller; and an auxiliary rail on the main frame for guiding movement of the auxiliary roller and transforming the link mechanisms, wherein the auxiliary rail has a shape, in a section between a forward path side horizontal section and a forward path side constant inclined section of the circulation path, such that, of the steps adjacent to each other, a moving track of relative position of the step on a lower step side with respect to the step on an upper step side is the same as a surface shape of the riser of the step on the upper step side.

2. The escalator with a high speed inclined section according to claim 1, wherein the surface shape of the riser is planar.

3. An escalator with a high speed inclined section comprising:

a main frame;

a plurality of steps, each step including
- a tread for carrying a passenger,
- a riser at a front or rear end of the tread,
- a driving roller shaft, and
- a driving roller rotatable about the driving roller shaft, the plurality of steps being coupled in an endless manner for circulation along a circulation path;

a plurality of transformable link mechanisms, each transformable link mechanism coupling the driving roller shafts of a respective adjacent pair of steps to each other, and changing an interval between the driving roller shafts of the adjacent pair of steps by transforming, each transformable link mechanism including a rotatable auxiliary roller;

a driving rail on the main frame for guiding movement of the driving rollers; and an auxiliary rail on the main frame for guiding movement of the auxiliary rollers and transforming the link mechanisms, wherein
- the circulation path has a forward path side section,
- the forward path side section has an upper curved section, a lower curved section, and a constant inclination section between the upper and lower curved sections, and
- the auxiliary rail has portions in which inclination of the auxiliary rail changes discontinuously at boundaries between the upper and lower curved sections and the constant inclination section.

* * * * *